Figure 3:
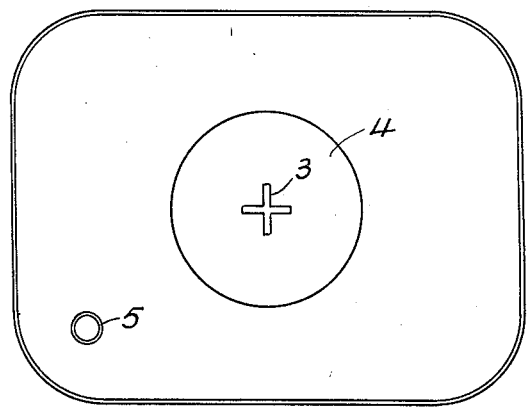

Feb. 26, 1946. L. L. YOUNG 2,395,605
LIGHT-DIRECTING DEVICE
Filed Dec. 7, 1943 2 Sheets-Sheet 1
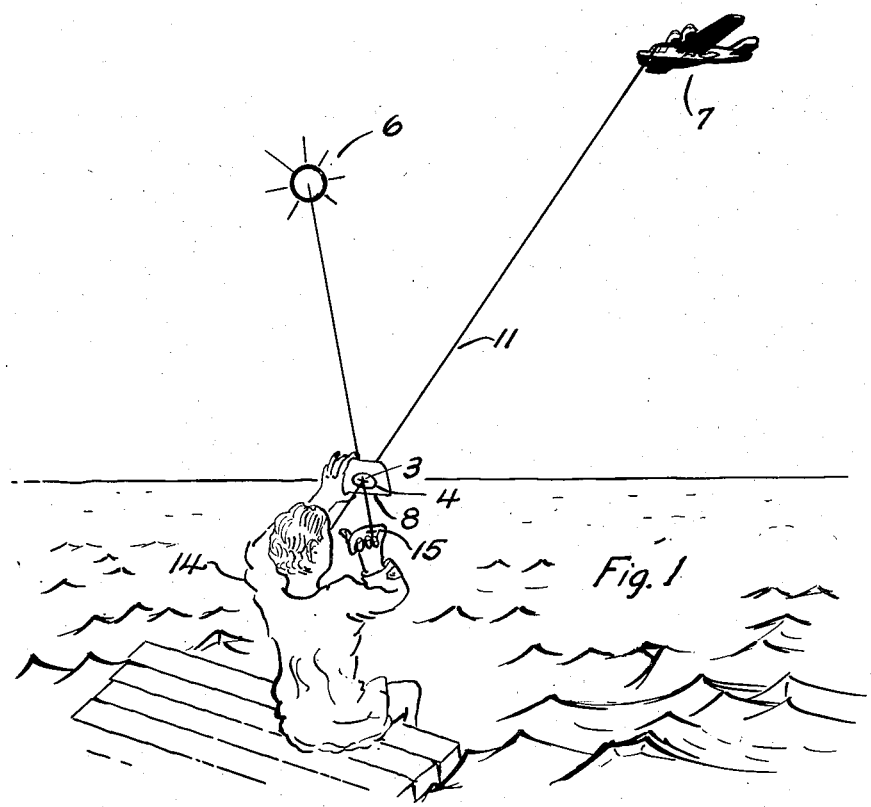
Fig. 1
Fig. 2
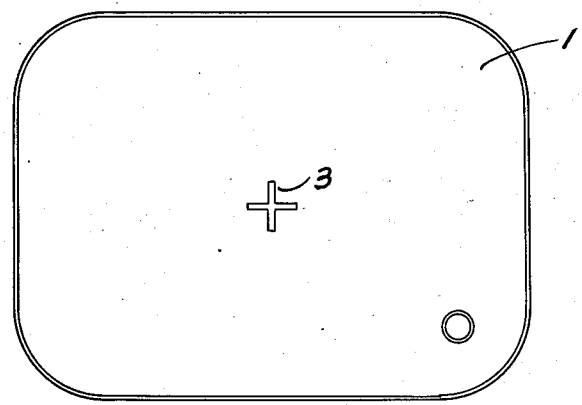
INVENTOR.
Larry L. Young
BY
Cushman Darby + Cushman
attys Feb. 26, 1946.  L. L. YOUNG  2,395,605
LIGHT-DIRECTING DEVICE
Filed Dec. 7, 1943  2 Sheets-Sheet 2

INVENTOR.
Larry L. Young
BY
Ashman Duby Ashman
attys

Patented Feb. 26, 1946

2,395,605

UNITED STATES PATENT OFFICE 2,395,605

LIGHT-DIRECTING DEVICE

Larry L. Young, Norwalk, Conn.

Application December 7, 1943, Serial No. 513,212

1 Claim. (Cl. 116—20)

The invention herein disclosed relates to a light-directive device and more particularly to a device of this kind that is especially suitable as a heliograph.

One of the problems that has confronted the military has been some simple means for men adrift at sea to attract the attention of those on board air and surface craft within the vicinity. Although life-boats might be equipped with various signaling devices such as flares, rockets, battery operated flash lights, etc., any equipment to be universally provided, especially for life jackets, must be extremely practical from the view point of size, weight, durability, range and operation.

A mirror reflecting sun light directly at air or surface craft, herein called a receiving station for convenience, is particularly effective in attracting attention. Mirrors also, when used in heliography have a good effective range. For example, on a fairly clear day of a visual range of forty miles, a flash from an eight inch square mirror can be seen at ten miles. There are many instances of lives being saved at sea by means of signals flashed from mirrors. Heretofore, however, this has been incidental and random in method as to directing the flash from the mirror.

The primary object of this invention is to provide a light-directive device or mirror that is provided with a means by which the light reflected from the mirror is readily, easily and accurately directed. Another object of the invention is to provide a mirror of this kind that is compact and durable.

These objects and certain advantages that will hereinafter appear are realized in the embodiment of the invention, illustrated by way of an example of a practical form of the invention, that is shown in the drawings and described in detail below.

Figure 4:

The drawings include:

Fig. 1 which illustrates the device in use;

Fig. 2 which is a side elevation of the front side of the mirror (the side which is turned toward the source of light);

Fig. 3 which is a side elevation of the rear side of the mirror;

Fig. 4 which is an edge view of the same; and

Figure 5:
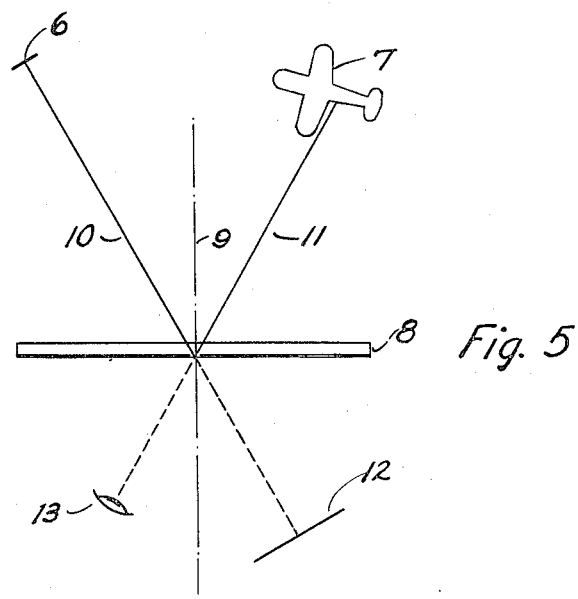

Fig. 5 which is a diagram of the mirror, light source and a receiving station.

The light-directive device illustrated in the drawings consists of a mirror having special features by which a beam of reflected light may be accurately directed to a receiving station, i. e. an object, moving vessel or aircraft. At short distances, on the ground or water, the reflected beam from a mirror can be made to form a spot and can be directed by observing the spot. At longer distances and at angles above the horizon the direction of the beam cannot be seen. The special features of the mirror of this invention permits a person to readily and accurately direct the reflected beam even when the beam cannot be observed by the person using the mirror.

An important use for the light-directive device of this invention is to aid rescue airplanes and ships in locating shipwrecked mariners adrift at sea. With the device, a person adrift at sea may flash or signal the rescue airplane or ship and so attract the attention of those on board and indicate to them his position. The mirror should, therefore, be made of durable materials which will withstand the conditions of service.

With this in view the mirror desirably consists of a piece of tempered, glazing quality, polished, plate glass 1 having one surface 2 coated with vaporized aluminum. Preferably, the corners are rounded and the edges ground and chamfered as illustrated. A suitable size would be an over all length of approximately five inches and an over all width of four inches.

The surface 2 of the piece of plate glass 1 is coated with vaporized aluminum except for a section as represented by the cross 3. The vaporized aluminum coating provides a reflecting surface of high efficiency. The cross 3, which is preferably located at the center of the mirror, constitutes a light-transmitting section through which light from the source, such as the sun may pass and through which the person using the device may observe the target or receiving station.

Except for a small area 4 about the section 3, the aluminum coating may desirably be covered with a black lacquer. On this black lacquer, instructions may be printed. The entire rear surface is then desirably coated with a clear transparent lacquer. The circular area 4 constitutes a mirror at the rear surface and surrounding the transparent section 3. An opening 5 may be provided through the mirror to receive a cord which the person using the mirror may place about his neck to prevent the loss of the mirror if it is dropped.

To have a beam of reflected light from a mirror fall upon a particular receiving station, the normal to the mirror must bisect the angle formed by lines converging from the light source and the receiving station and meeting at the mirror. This relation is illustrated diagrammatically in Fig. 5. In this figure the sun, constituting the light source, is represented at 6. The receiving station is represented as an airplane 7, and the mirror at 8. When the mirror is positioned so that the normal 9 to the plane thereof bisects the angle made by the lines 10 and 11, the beam of reflected light falls upon the receiving station 7.

With the mirror of this invention this relation is readily obtained. Light from the light source passes through the light-transmitting section 3 of the mirror and will form a spot of light, in this case a cross, on a surface held close to the mirror such as the surface 12. Also, an observer, represented by the eye 13, may, through the section 3, sight the receiving station. If the receiving station be continuously observed, and the mirror positioned such that the light falling upon the surface 12 is reflected back through the section 3, the mirror is positioned to flash the receiving station 7.

This relation is readily obtained with the device disclosed above. In use, an observer 14 (Fig. 1) holds the mirror 8 a few inches in front of his eye with the rear surface toward him, and faces the mirror half way between the sun 6 and the receiving station 7. If the sun shining through the section 3 does not fall upon his person, he intercepts the image 15 of the cross with his hand. He then tilts the mirror so as to see in the reflector 4 the image 15 of the cross thus formed. Through the center of the cross 3 he sights the receiving station 7 and tilts the mirror to direct the reflection of the image 15 back through the cross. The mirror is now aimed so that the reflected beam, represented by the line 11 falls directly upon the receiving station 7.

It will be obvious that various changes may be made by those skilled in the art in the preferred embodiment of the invention illustrated in the drawings and described above without departing from the principle and scope of the invention as expressed in the appended claim.

I claim:

The method of aiming a regularly reflected beam of light upon a target from a plane mirror comprising two plane mirror surfaces disposed back-to-back and having an aperture through said surfaces, which method comprises the steps of exposing one of said surfaces to a concentrated source of light so that light from said source incident on said surface is regularly reflected and part of said light passes through said aperture, intercepting on a reflecting surface spaced from said mirror the light from said source passing through said aperture to create a secondary light source in line with said aperture and said concentrated source, finding the virtual image of the secondary source in the mirror surface facing said secondary source and, while viewing the target through the aperture, adjusting the mirror to center the image on the aperture.

LARRY L. YOUNG.